Sept. 21, 1937.    P. M. McKENNA    2,093,844
HARD COMPOSITION OF MATTER
Filed Sept. 6, 1935
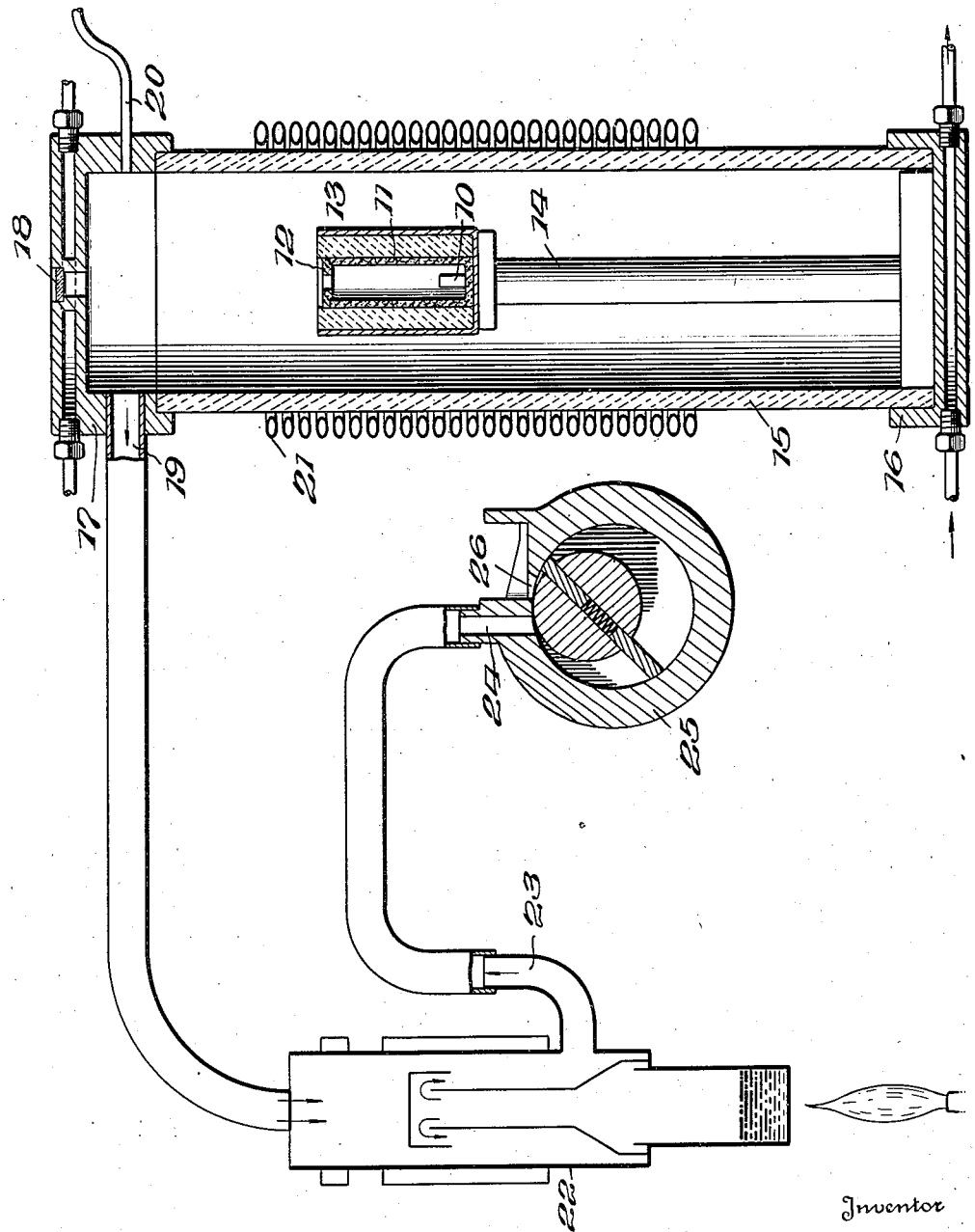
Inventor
Philip M. McKenna,
By Church & Church
His Attorneys Patented Sept. 21, 1937

2,093,844

UNITED STATES PATENT OFFICE 2,093,844

HARD COMPOSITION OF MATTER

Philip M. McKenna, Latrobe, Pa.

Application September 6, 1935, Serial No. 39,505

9 Claims. (Cl. 75—136)

My invention relates to new hard compositions of matter. It has to do, more particularly, with certain novel compositions of matter, notable for their combined strength and hardness, so that they are particularly useful in the construction of tools, dies and other articles of wear-resisting or corrosion-resisting nature, as well as articles which are required to resist deformation or destruction at high temperatures and pressures. In particular, my invention relates to the production of new hard compositions of matter, which are particularly useful as the hard bits or tips including the cutting edges of tools intended for cutting hard materials. These compositions are also particularly adapted to use as wire-drawing dies.

The principal object of my invention is to provide new hard compositions of matter, which have greater combined strength, hardness and resistance to deformation at high temperatures and pressures than any hard compositions of matter heretofore known.

A further object of my invention is to provide new hard compositions of matter, having great combined strength, hardness and resistance to deformation, which are made from macro-crystalline carbides of the metals of the group including tantalum and columbium, with or without, as a minor constituent, one or more of the carbides of the group including tantalum, columbium, titanium and zirconium, which carbides are characterized, not only by their macro-crystalline form, but by a carbon content in true monatomic ratio to the metal or metals present. In other words, it is an object of my invention to produce new hard compositions of matter, having useful characteristics as indicated, which are made from the new macrocrystalline product, instead of the amorphous material heretofore known, for example, as tantalum carbide and consisting of carburized tantalum, in which the carbon is not present in exact monatomic ratio to the tantalum.

A further object of my invention is to provide novel hard compositions of matter, having great combined strength and hardness, which include titanium carbide or zirconium carbide, or both of them, as constituents.

It is a further object of my invention to provide novel hard compositions of matter, including tantalum carbide or columbium carbide, or both of them, together with tungsten metal or molybdenum metal, or both, and a metal or metals of the iron group, in which the proportion of the metals of the group including tungsten and molybdenum to the total non-carbide ingredients of the composition is substantially higher than has been possible heretofore without sacrificing strength. This is an important feature, because an increased proportion of tungsten or molybdenum, or both, imparts to the hard compositions of matter the property of resisting deformation, especially at high temperatures, but, heretofore, it has not been possible to include as much tungsten or molybdenum as was desired, because of the deleterious effect upon the strength of the resulting composition.

Further objects, and objects relating to details and economies of production and operation, will definitely appear from the detailed description to follow. In one instance, I accomplish the objects of my invention by the devices and means set forth in the following specification. My invention is clearly defined and pointed out in the appended claims. The annexed drawing, forming a part of this specification, illustrates diagrammatically a form of apparatus which I have found useful in carrying out one step of my new process.

Hard compositions of matter have been known, heretofore, which consisted of an amorphous material, called "tantalum carbide", together with certain proportions of a metal or metals of the group including tungsten and molybdenum, and a metal or metals of the group including iron, cobalt and nickel. The best of these hard compositions of matter was composed as follows: Amorphous tantalum carbide, 78 per cent, nickel, 10.2 per cent, tungsten, 11.8 per cent. This material was made by comminuting the amorphous tantalum carbide and metallic tungsten in a ball mill, using nickel balls, in a bath of naphtha, until the mixture contained the tantalum carbide, tungsten and nickel in the desired degree of fineness and in the required proportions above given. The naphtha was then removed entirely by heating in a partial vacuum at a red heat. A piece was then formed from this dried powder of the desired shape and that piece heated in an electric furnace, under a partial vacuum, corresponding approximately to a pressure of from 70 to 80 microns of mercury, for forty minutes. As the result of this treatment, a hard composition of matter was formed having a Rockwell "A" hardness of 86.5. The strength of the piece thus formed is indicated by the fact that the piece, having a thickness of .200 inch and a width of .375 inch, resting on supports 1¼ of an inch apart, when pressed in the middle with a one centimeter Brinell ball, broke under a load of 1980 kilograms.

Another example of similar hard compositions of matter, heretofore known, is one which comprised 80 per cent amorphous tantalum carbide, 8 per cent nickel and 12 per cent tungsten. This composition had a Rockwell "A" hardnes of 87.75 and broke, under the same conditions as specified above, at a load of 1500 kilograms. These two hard compositions of matter, just described, represent what I believe to be the most desirable hard compositions of this type heretofore made, known or used.

These compositions were made from a material which was called "tantalum carbide", but in which the carbon was not present in exact monatomic ratio to the tantalum. This material is amorphous in character, in that it did not present crystalline form to the unaided human eye. For the purposes of this specification I define "macro-crystalline" as having particles which average greater than .01 millimeter in largest cross section dimension and "amorphous" as having particles which average less than .01 millimeter in largest cross section dimension. I understand that there is another sense, in which all solid bodies may be described as crystalline, and may be shown to have ordered atomic arrangement by X-ray methods, or to have crystalline form which may be seen under the microscope, but I do not use the term in this sense, in this specification.

It will be observed that, in the two compositions above-mentioned, the nickel and tungsten together constitute 22 per cent and 20 per cent, respectively, of the composition, and that the tungsten constitutes 53.6 per cent and 60 per cent, respectively, of the ingredients of the composition other than the tantalum carbide. I had believed it desirable, if possible, to increase the proportion of tungsten in the noncarbide ingredients of the composition, but I had found that this was not feasible, heretofore, because a further increase in the proportion of tungsten resulted in a decrease in the strength of the composition, which was undesirable, as the piece would break or chip when used as a metal cutting tool. Thus, although a higher percentage of tungsten is desirable, in order to give the composition increased resistance to deformation, especially at high temperatures, this increased proportion of tungsten could not be obtained, heretofore, without an accompanying decrease in the strength of the composition.

Hard compositions of matter have been proposed, heretofore, including columbium carbide, of the amorphous type in which the carbon is not present in true monatomic ratio to the columbium, together with certain proportions of tungsten and cobalt, but such hard compositions were lacking in practical value, because of the weakness of the material.

It has also been proposed, heretofore, to make hard compositions of matter from a mixture of amorphous tantalum carbide and amorphous columbium carbide, the particles of which were united into a cohesive mass by a mixture of metallic iron and molybdenum. Although such compositions were hard, they were lacking in strength as they would break under a load which was only about one-third of the breaking load of the amorphous tantalum carbide composition heretofore referred to.

In general, my invention consists of novel hard compositions of matter made from a macro-crystalline carbide or carbides of the metals of the group including tantalum and columbium, containing carbon in true monatomic ratio to the metal or metals present. The macro-crystalline carbide forming the starting ingredient for the new composition is comminuted, in a non-oxidizing bath, as by a ball mill, for such length of time as needed to reduce the crystals to the desired degree of fineness and to incorporate in the mixture the desired proportions of a metal or metals of the group including tungsten and molybdenum, and of a metal or metals of the iron group. The powdered mixture thus formed after drying off some of the naphtha is pressed to the shape of the piece to be made, the linear dimensions, however, being from 15 to 25 per cent greater than those of the ultimate piece, depending upon the shrinkage which takes place in the process, and the piece thus shaped is heated, under a partial vacuum, in an electric furnace, for about forty minutes, at a temperature of about 1430° C. The heating should require about two hours in all, one hour and twenty minutes being consumed in gradually raising the furnace to the ultimate temperature and removing the gas and vapors, and the furnace being maintained at the ultimate temperature for about forty minutes. As a result of this treatment, the shaped piece shrinks into a cohesive bit of like shape, but smaller dimensions, and it is believed that the metal or metals of the group including tungsten and molybdenum, and the metal or metals of the iron group, included in the composition, function to unite the grains of carbide into a cohesive mass. As will be shown hereinafter, the resulting composition has a hardness equal to that of the compositions heretofore referred to, with a strength and resistance to deformation, especially at high temperatures, which exceeds that of said compositions.

The macro-crystalline carbides and multi-carbides, which I contemplate using in my present invention, and the method of making such carbides and multi-carbides, are fully described in my pending application for United States Letters Patent, Serial No. 31,521, filed July 15, 1935, entitled, "Carbides of tantalum and like metals and method of producing the same", to which cross-reference is hereby made.

My present invention contemplates novel hard compositions of matter made from macro-crystalline tantalum carbide, macro-crystalline columbium carbide, or a macro-crystalline multi-carbide comprising either tantalum carbide or columbium carbide as a major constituent, and columbium carbide or tantalum carbide as a minor constituent. I believe that the minor constituent is present in solid solution in the major constituent, and this belief is confirmed by the X-ray spectrograms of these multi-carbides. My present invention contemplates, also, new hard compositions of matter including macro-crystalline multi-carbides in which either tantalum carbide or columbium carbide constitutes the major constituent, and one or more carbides of the metals of the group including tantalum, columbium, titanium and zirconium constitute the minor constituent. A study of these multi-carbides, also, has shown that the minor constituent is present in solid solution in the major constituent within certain limiting percentages of the solute. Thus, I contemplate the formation of new compositions of matter from macro-crystalline multi-carbides in which, for instance, titanium carbide or zirconium carbide, or both of them, are present in solid solution in tantalum carbide or columbium carbide, and I have found that the hard compositions of matter made from these macro-crystalline multi-carbides exhibit very useful combinations of hardness, whose hard composition is substantially higher than has been ness, strength and resistance to deformation, surpassing to a surprising degree anything that has been produced heretofore.

In general, the percentage of carbide, or multi-carbide, contained in my new composition is somewhat less than in the hard compositions of matter heretofore known, such as the two examples previously referred to, but, notwithstanding, the combined hardness, strength and resistance to deformation is greater. In general, also, in my new compositions made in accordance with this invention, the tungsten or molybdenum, or both, constitute a greater proportion of the non-carbide ingredients of the composition than has been the case heretofore, but, nevertheless, this increase in the proportion of tungsten does not result in a weakening of the composition, but, on the contrary, a strong composition is obtained and one having greater resistance to deformation, especially at high temperatures. This result is surprising, in view of the prior experience which led the worker in this art to believe that an increase in the proportion of tungsten would necessarily weaken the composition.

The following are specific examples of new compositions of matter, made in accordance with my invention, from macro-crystalline carbides and multi-carbides of the character described in my pending application for United States Letters Patent, Serial No. 31,521. In the formulas, given in this specification, for these multi-carbides, I have included in parentheses the symbol or symbols for the metal or metals, the carbides of which form the minor constituent. It is necessary, in forming hard compositions of matter from these carbides and multi-carbides to provide other metals, which I believe perform the function of uniting the grains of carbide or multi-carbide to form a cohesive mass and forming a matrix in which the grains of the hard carbide are embedded. These metals forming the matrix may comprise one or more of the metals of the group including tungsten and molybdenum, and one or more of the metals of the iron group. Small quantities of manganese, beryllium and aluminum may also, at times, be present with advantageous results. In general, I have found that a combination of tungsten and nickel serves, in most circumstances, to form the sort of matrix desired.

I have found that a very satisfactory hard composition of matter may be formed from macro-crystalline TaC, W and Ni, as follows: The TaC may constitute from 55 to 82 per cent of the composition, W, from 10 to 40 per cent, and Ni, from 5 to 15 per cent. The range of proportions which I prefer is TaC, from 70 to 82 per cent, W, from 11 to 38 per cent, and Ni, from 5 to 12 per cent. The following are the specific proportions of the ingredients in two specimens of this composition, that I have made and found useful:

|        | TaC     | W       | Ni      |
|--------|---------|---------|---------|
|        | Percent | Percent | Percent |
| Spec. A| 74.6    | 18.0    | 7.4     |
| Spec. B| 78      | 11.2    | 10.8    |

In each of these specimens, the tantalum carbide used as the starting material was macro-crystalline and had a carbon content in true monatomic ratio to the tantalum present and, in that respect, distinguishes from the amorphous material heretofore known as tantalum carbide. The specimens, above mentioned, were subjected to tests to determine their hardness, strength and resistance to deformation, especially at high temperatures. Specimen A had a Rockwell "A" hardness of 89.8 and a breaking strength of 1720 kilograms, determined in the same way as with the prior compositions hereinbefore mentioned. Lathe tests showed that this composition of matter suffered less deformation, at the high temperatures resulting from the cutting action, than the prior compositions. In other words, this new hard composition of matter, specimen A, did not show a tendency to "mushroom" under conditions which would cause the prior compositions to do so. Tests upon specimen B, which, in proportion of ingredients, was about the same as one of the prior compositions referred to, differing therefrom in that it is made from macro-crystalline tantalum carbide instead of amorphous material, showed that it had a Rockwell "A" hardness of 87.62 and a breaking point of 2320 kilograms.

Comparison with the prior compositions shows that specimen A was harder than the prior composition containing 78 per cent amorphous tantalum carbide and not quite so strong, having a breaking strength of 1720 kilograms, as compared with 1980 kilograms. This specimen did, however, exhibit increased resistance to deformation at the cutting temperature. Specimen A was about as hard as the prior composition containing 80 per cent amorphous tantalum carbide and stronger, having a breaking point of 1720 kilograms, as compared with 1500 kilograms. Specimen B, which contained 78 per cent macro-crystalline tantalum carbide, was harder than the corresponding prior composition and about as hard as the prior composition containing 80 per cent amorphous tantalum carbide. It was stronger than either of these prior compositions, having a breaking strength of 2320 kilograms as compared with 1980 kilograms and 1500 kilograms, respectively. It appears, therefore, that these new compositions of matter, made from macro-crystalline TaC, show a better combination of strength, hardness and resistance to deformation than the prior compositions.

The following is a specific example of a new composition of matter, made in accordance with my present invention, using macro-crystalline CbC as the starting material. The macro-crystalline CbC may constitute from 40 to 75 per cent of the composition, W may constitute from 16 to 33 per cent, and Ni, from 10 to 30 per cent. If Mo is substituted for W, it may constitute from 9 to 20 per cent of the composition and, in that case, Ni may constitute from 12 to 33 per cent. I prefer that, where W is used in the composition, the CbC should range from 55 to 65 per cent of the composition, W, from 18 to 22 per cent, and Ni, from 15 to 25 per cent. If, however, Mo be used in place of W, the preferred range of proportions is as follows: CbC, 65 to 72 per cent, Mo, 10 to 14 per cent, and Ni, 18 to 27 per cent. The specific proportions of ingredients used in the making of a specimen of this composition from macro-crystalline CbC is as follows: CbC, 59.4 per cent, W, 20.7 per cent, and Ni, 19.9 per cent. Tests on this specimen showed that it had a Rockwell "A" hardness of 85.2 and a breaking strength of 2030 kilograms. While not quite so hard as prior compositions made of amorphous tantalum carbide, it exceeded these compositions in strength and was far superior in strength and resistance to deformation to any materials heretofore made from amorphous columbium carbide.

The following are the specific proportions of a composition made from macro-crystalline CbC, using molybdenum in place of tungsten: CbC, 73 per cent, Mo, 12 per cent, and Ni, 15 per cent. I believe that this composition also exhibits an excellent combination of strength, hardness and resistance to deformation, especially at high temperatures.

A valuable hard composition of matter may also be made, in accordance with my present invention, using as the starting material the macro-crystalline multi-carbide, in which TaC constitutes the major constituent, and CbC the minor constituent. This multi-carbide is expressed by the formula Ta (Cb) C. The CbC may constitute from 1 to 25 per cent of the multi-carbide. In this composition, the Ta (Cb) C may constitute from 50 to 81 per cent of the composition, W, from 13 to 43 per cent, and Ni, from 5 to 15 per cent. The preferred range of proportions is as follows: CbC, from 5 to 13 per cent of the Ta (Cb) C, Ta (Cb) C, 68 to 80 per cent, W, 13 to 25 per cent, and Ni, 5 to 12 per cent. The specific proportions of an actual specimen of this composition, made from macro-crystalline Ta (Cb) C, in which the proportion of CbC was 8.8 per cent, are as follows: Ta (Cb) C, 75 per cent, W, 15 per cent, and Ni, 10 per cent. Tests upon this specimen showed that it had a Rockwell "A" hardness of 88.5 and a breaking strength of 2060 kilograms. Thus, in both strength and hardness, this composition was superior to the prior compositions hereinbefore mentioned. Tests upon cutting tools, including bits made from this composition, showed that they were very much better than any heretofore known, in that the tools did not fail, either by deformation, that is, "mushrooming", or by chipping. Cutting tools made from this composition have been put to actual use at a Governmental arsenal, in turning anti-aircraft projectiles, and this experience has demonstrated that these tools will cut longer, without chipping or showing fatigue cracks, and without the necessity of frequent dressing, than any heretofore known.

A valuable hard composition of matter may also be made, in accordance with my invention, using as a starting material the macro-crystalline multi-carbide represented by the formula Ta (CbTi) C, in which TaC is the major constituent and CbC and TiC are minor constituents. The Ta (CbTi) C may include from 1 to 15 per cent CbC and from 1 to 15 per cent TiC. The composition may include from 61 to 77 per cent Ta (CbTi) C, from 17 to 36 per cent W, and from 3 to 15 per cent Ni. In the preferred range of proportions, the Ta (CbTi) C includes from 8 to 13 per cent CbC and from 8 to 12 per cent TiC, and the composition includes from 63 to 75 per cent Ta (CbTi) C, from 18 to 25 per cent W, and from 5 to 8 per cent Ni. A specimen of this composition, which gave excellent results under tests, was of the following proportions: The Ta (CbTi) C included 13 per cent CbC and 9 per cent TiC. The composition included 73 per cent Ta (CbTi) C, 20 per cent W, and 7 per cent Ni. This specimen was subjected to tests which showed a Rockwell "A" hardness of 91 and a breaking strength of 1500 kilograms. This composition, therefore, was considerably harder than the prior compositions, while having a breaking strength the same as the prior composition containing 80 per cent amorphous tantalum carbide. The value of this increased hardness was strikingly demonstrated by the fact that cutting tools, having bits made from this composition, turned successfully hardened high-speed steel containing 18 per cent W, 4 per cent Cr and 1 per cent Va, together with about .65 per cent C, and quenched from 2350° F. in oil. Heretofore, it has been impossible to turn successfully such hardened high-speed steel and, for that reason, tools have been made of such steel for cutting other steels. Moreover, these cutting tests showed that this composition was extremely resistant to deformation at high temperatures and that it was not subject to "mushrooming" or chipping in the course of the cutting operation.

Another new hard composition of matter may be made in accordance with my invention, using as a starting material the macro-crystalline multi-carbide expressed by the formula Ta (Zr) C, in which TaC constitutes the major constituent and ZrC the minor constituent. The ZrC may constitute from 1 to 23 per cent of the Ta (Zr) C. The Ta (Zr) C may constitute from 55 to 80 per cent of the composition, W, from 4 to 20 per cent, and Ni, from 5 to 26 per cent. The preferred range of proportions is as follows: ZrC, from 8 to 13 per cent of the Ta (Zr) C, Ta (Zr) C, from 65 to 80 per cent of the composition, W, from 8 to 18 per cent, and Ni, from 12 to 18 per cent. A specimen of this composition, which has shown very good results under tests, had the following specific proportions: ZrC, 9 per cent of the Ta (Zr) C, Ta (Zr) C, 74 per cent of the composition, W, 11 per cent, Ni, 15 per cent. This specimen showed a Rockwell "A" hardness of 88.8, and a breaking strength of 1887 kilograms. Thus, it was harder than prior compositions made from amorphous TaC, and of comparable strength. Cutting tests with tools, including bits made of this composition, showed a greater resistance to deformation under high temperatures than the prior compositions made from amorphous tantalum carbide.

Another new hard composition of matter may be made, in accordance with my present invention, using as a starting material the macro-crystalline multi-carbide expressed by the formula Ta (CbZr) C, in which TaC is the major constituent, and CbC and ZrC are the minor constituents. The CbC may constitute from 1 to 16 per cent of the Ta (CbZr) C, and the ZrC may constitute from 1 to 9 per cent of the multi-carbide. The Ta (CbZr) C may constitute from 53 to 78 per cent of the composition, W, from 5 to 21 per cent, and Ni, from 5 to 28 per cent. The preferred range of proportions for this composition is as follows: From 4 to 16 per cent CbC and from 2 to 8 per cent ZrC in the Ta (CbZr) C, from 68 to 78 per cent Ta (CbZr) C, in the composition, from 7 to 12 per cent W, and from 12 to 15 per cent Ni. A specimen of this composition, which showed excellent results under tests, had the following specific proportions: 15 per cent CbC and 4.5 per cent ZrC in the Ta (CbZr) C, 76.2 per cent Ta (CbZr) C, 10 per cent W, and 12.8 per cent Ni. Tests of this specimen showed a Rockwell "A" hardness of 87 and a breaking strength of 2415 kilograms. Thus, while the hardness of this material was substantially the same as that of prior compositions made of amorphous tantalum carbide, it was much stronger. Furthermore, tests showed that this composition was particularly good for intermittent cutting, in which the tool may be subjected to a blow or blows between successive cuts. Such intermittent cutting is, of course, a severe test of the strength of a tool composition.

Another novel hard composition of matter may be made, in accordance with my invention, using as a starting material the macro-crystalline multi-carbide expressed by the formula Cb (Ti) C, in which CbC constitutes the major constituent, and TiC the minor constituent. The TiC may comprise from 1 to 28 per cent of the Cb (Ti) C, the Cb (Ti) C may constitute from 40 to 82 per cent of the composition, W, from 8 to 23 per cent, and Ni, from 10 to 28 per cent. The preferred range of proportions is as follows: TiC, from 5 to 18 per cent of the Cb (Ti) C, Cb (Ti) C, from 63 to 82 per cent of the composition, W, 8 to 18 per cent, Ni, 10 to 22 per cent. A specimen of this composition, which gave desirable results, under tests, had the following specific proportions: 17.3 per cent TiC in the Cb (Ti) C, 79.78 per cent Cb (Ti) C, 8.85 per cent W, and 11.47 per cent Ni. Tests of this specimen showed a Rockwell "A" hardness of 91 and a breaking strength of 1325 kilograms. Thus, this specimen was very hard and, although it was not as strong as some compositions, I believe that the strength may be increased, without losing hardness, increasing the tungsten content.

The specific examples of hard compositions of matter, made in accordance with my invention, just given, are illustrative of the new compositions that may be made by the use, as starting materials, of the macro-crystalline carbides and multi-carbides of the character described and claimed in my pending application for United States Letters Patent, Serial No. 31,521. It will be understood, of course, that I have not described specifically all of the possible combinations. In general, molybdenum may be substituted for all or a part of the tungsten in any of these compositions, it being understood that, in making such substitution, the proportion of the metal used should be adjusted in the ratio of the atomic weights of tungsten and molybdenum. It will be understood, also, that cobalt may be substituted in whole or in part for the nickel, the proportions being adjusted in the ratio of the atomic weights of cobalt and nickel. Iron may also be substituted for a part of the nickel or cobalt, but the fact that iron, in finely divided form, oxidizes readily, under the conditions present in making these compositions, renders its use in substitution for all or a major proportion of the nickel undesirable.

To express the range of proportions of these compositions, I prefer to state the proportions in molecular and atomic percentages of the ingredients. I prefer that the carbide or multi-carbide shall constitute from 68.1 to 55.64 molecular per cent of the composition, that a metal or metals of the group including tungsten and molybdenum should constitute from 15.58 to 17.66 atomic per cent of the composition, and that a metal or metals of the iron group shall constitute from 20.5 to 26.7 atomic per cent of the composition. I prefer, further, that, in the case of the multi-carbides, the minor constituent or constituents shall constitute less than 40 molecular per cent of the multi-carbide, as this is about the maximum which will go into solid solution in the major constituent. I prefer, however, to use less than the maximum amount of minor constituent, which would go into solid solution in the major constituent, and I have determined that it is advantageous to have the minor constituent constitute about 25 per cent of the multi-carbide.

I believe that, where the carbide is columbium carbide, or a multi-carbide in which CbC is the major constituent, compositions having a better combined strength, hardness and resistance to deformation may be produced by substituting molybdenum, in whole or in part, for the tungsten.

The following is the preferred method, which I propose to use for the making of these new hard compositions of matter, in accordance with my present invention. The maco-crystalline carbide, or multi-carbide, is ground and comminuted in a ball mill with metallic tungsten or molybdenum and nickel, cobalt or iron. Since nickel is most frequently used, it has been found good practice to use nickel balls in the ball mill, the body of which is also made of nickel, or other alloy containing nickel, so that the required portion of nickel may be introduced into the powder mixture by attrition from the balls and the body of the mill. The comminution of the carbide, or multi-carbide, and the metallic ingredients of the composition is continued for the length of time required to reduce the ingredients to the desired state of fineness and until they are present in the proper proportions.

I have found it desirable in this step of the method, that is to say, in the preparation of the powder mixture, to comminute a portion of the carbide, or multi-carbide, for a longer time than the rest of it, the two batches being subsequently mixed thoroughly, before subjecting the powder mixture to the succeeding steps of the process. In this way, I provide the carbide, or multi-carbide, in the powder mixture in grains of differing or diverse size. I have found that desirable results are obtained if about 30 per cent of the carbide or multi-carbide used in the composition, has a grain size of from 5 to 7 microns, while the rest of the carbide or multi-carbide has a grain size of about 1 micron. Comminution of the micro-crystalline carbide or multi-carbide, in a ball mill, for about four days, suffices to reduce the material to a grain size of from 5 to 7 microns, while continued comminution of the material for from fifteen to twenty days is required to reduce it to a grain size of about 1 micron. I have found that the presence of grains of the carbide, or multi-carbide, of diverse size is advantageous, but I am not to be confined to the percentage of large particles indicated above or to the precise differences in grain size, as further experience may demonstrate that these are not essential.

The carbide, or multi-carbide, used as a starting material is macro-crystalline and, therefore, of a grain size exceeding 10 microns. Before subjection to heat treatment to form the hard composition, the macro-crystalline carbide, or multi-carbide, is, by comminution, reduced to such a grain size that it is no longer macro-crystalline, but, nevertheless, the fact that a macro-crystalline carbide has been comminuted to form the powder mixture is very important, because the comminution of such macro-crystalline material provides a greater area of freshly fractured surface than does the comminution of amorphous material, such as has been used heretofore. This larger area of freshly fractured surface, in the powder mixture, is important, because it promotes a more effective union of the carbide particles by the metals constituting the matrix and, thus, contributes materially to the formation of a stronger, hard composition, in which it is more difficult to dislodge the particles of hard carbide from the matrix, under conditions of use.

The comminution of the macro-crystalline carbide, or multi-carbide, together with the other metal or metals of the compositions, is carried out in a bath of naphtha, that is to say, a liquid hydrocarbon consisting principally of hexane. This is for the purpose of preventing the oxidation of the particles of the powder mixture during the process of comminution, and particularly for the purpose of preventing the oxidation of the freshly fractured surfaces thereof. Other non-oxidizing baths may be used, but naphtha has been found suitable as a liquid for that purpose. Past experience with the comminution of ingredients of a hard composition in a bath of naphtha has shown that the results are sometimes uncertain and that the hard composition is of varying strength. I have found that this is due to slight oxidation of the freshly fractured surfaces of the ingredients, notwithstanding the naphtha bath, due, probably, to impurities contained in the naphtha, in the nature of oxygen or sulphur-containing compounds. I have, therefore, subjected the naphtha to a special treatment, before using it as the comminuting bath, for the purpose of removing these impurities from the bath. I have subjected the naphtha to freshly cut surfaces of metallic sodium, as by whittling or cutting metallic sodium beneath the surface of the naphtha. This results in the formation of bubbles of gas in the naphtha, which indicate a reaction between the sodium and oxygen-containing compounds in the naphtha, as well as sulphur-containing compounds thereof. At first, the sodium discolors immediately, losing its metallic lustre, but, on continued treatment, the naphtha loses its property of discoloring the freshly cut surface of sodium, and is then suitable for use as the comminuting bath. Whatever the reaction may be, I have found that the process of making hard compositions of matter is more sure, and the results obtained more uniform and certain, when the naphtha is subjected to this preliminary treatment before using it as the bath in which the ingredients of the powder mixture are comminuted. I believe that this is due to the removal from the bath of impurities having an oxidizing effect upon the freshly fractured surfaces of the ingredients. Instead of sodium, I may use other metals of equivalent character, having a like reaction to oxygen or sulphur-containing compounds, as, for instance, potassium, rubidium, caesium, lithium and calcium.

When the ingredients have been comminuted to the desired fineness, they are removed from the bath and partially dried, so that most of the naphtha is removed therefrom. Heretofore, it has been the practice to dry the powdered mixture completely, either in air or under a partial vacuum. This was in order to remove from the mixture the naphtha vapors, because these vapors interfered with the securing of the degree of vacuum wished for the subsequent heat treatment. It had been found that, if naphtha vapors remained in the powder, they would contaminate the oil of the oil pump used to produce a partial vacuum for heat treatment and prevent obtaining a good vacuum at this stage. This drying of the powder, to remove naphtha vapors completely, also had a tendency to promote oxidation of freshly fractured surfaces and thus rendered the strength of the resulting composition somewhat uncertain.

I have not dried the powder, after comminution, so completely as to remove all naphtha and naphtha vapors therefrom, but have left from 1 to 5 per cent of the naphtha in the powder. This serves, to some degree, to protect the powder from oxidation prior to and during the first stages of heat treatment, and thus contributes to the formation of a hard composition of greater strength, and especially one having a greater resistance to fatigue cracking. The comminuted powder having been dried, to the degree indicated, is pressed into bits of the shape desired. The dimensions, of course, exceed somewhat those of the bit to be ultimately formed, so as to compensate for the shrinkage which takes place in the heat treatment.

The bits so formed are then subjected to heat treatment under a vacuum of from 40 to 7 microns of mercury pressure, in an electric furnace, being heated for about forty minutes at a temperature of from 1400° C. to 1500° C. I have found that the best results are obtained when the temperature is somewhat above 1400° C. The temperature depends somewhat upon the ratio of tungsten to tungsten and nickel. When this ratio is 50 per cent, a temperature of about 1425° C. is used. When greater proportions of tungsten are used, a somewhat higher temperature is required. In my new method, a somewhat higher temperature may be used, without weakening the bit, than was possible, under the old methods, in making compositions from amorphous tantalum carbide. Although the bits are to be heated for about forty minutes at a temperature between 1400 and 1500° C., it is to be understood that the furnace is raised slowly to this temperature after the bits have been placed therein. I usually take about one hour and twenty minutes to get the furnace up to the temperature desired and, then, heat the bits at that temperature for about forty minutes.

As stated, this heat treatment is carried out under a partial vacuum amounting to from 40 to 7 microns of mercury pressure. This is a higher vacuum than has been used heretofore and I believe it contributes to the good results obtained. I use a different apparatus for obtaining this vacuum, in that the electric furnace is connected with a mercury diffusion pump which draws off and absorbs gases and vapors, including the vapors coming from the hydrocarbon of the bath, which remain in the bits when they are placed in the furnace. The outlet of the mercury diffusion pump is connected to an oil pump, such as has been used heretofore in connection with the electric furnace. By the use of the mercury diffusion pump, the hydrocarbon vapors are prevented from contaminating the oil of the oil pump and, by this combination, the pressure is reduced, within the treatment chamber of the electric furnace, to a degree which has not been attained heretofore.

The drawing annexed to this specification illustrates this apparatus diagrammatically. The bit or bits 10 are placed in a graphite crucible 11 having a lid 12, which crucible is surrounded by a refractory lining 13 and mounted upon a refractory support 14. This is enclosed within a refractory sleeve or cylinder 15, mounted upon a water-cooled base 16 and having a water-cooled cover 17, provided with a peep hole 18. The cover 17 is provided with an outlet connection 19, and also with a connection 20 to a gauge which indicates the pressure within the treatment chamber. The refractory cylinder 15 is surrounded by a cooled coil 21, connected to a source of suitable electric current of high frequency. The outlet 19 of the treatment chamber is connected to a mercury diffusion pump, indicated diagrammatically at 22. This is a standard piece of apparatus and the Gaede mercury diffusion pump, manufactured by E. Leybold's Nachfolger A. G., of Berlin, Germany, is one which I have found suitable for this purpose. A detailed description of this mercury diffusion pump is not necessary. The outlet 23 of the mercury diffusion pump is connected to the inlet 24 of a suitable oil pump, indicated diagrammatically at 25, and having an outlet 26.

When the bits are placed within the furnace, they include a small percentage of liquid hydrocarbon from the bath, which helps to protect them against oxidation up to this stage of the process. The mercury diffusion pump and the oil pump being put in operation, the furnace is gradually evacuated and the mercury diffusion pump is effective in removing the hydrocarbon vapors coming from the bits, without any contamination of the oil in the oil pump. By this combination of pumps, therefore, I am able, notwithstanding the presence of hydrocarbon in the bits, to produce a higher degree of vacuum in the furnace, and, because of this, the bits may be treated at a somewhat higher temperature, without loss of strength. I believe that this contributes also to the good results which I have been able to obtain.

I believe that one reason for the good characteristics of hard compositions of matter, which have as an ingredient a comminuted macro-crystalline multi-carbide including TiC or ZrC, is that, when the TiC or ZrC, or both of them, are in solid solution in the TaC or CbC, they are capable of treatment by processes of powder metallurgy, which would destroy their surfaces when present alone, in the form of the chemically simple ZrC or TiC. That is to say, the TaC or CbC, in which the ZrC or TiC is dissolved, keeps it from being oxidized or otherwise reacted upon, during the grinding and heat treatments. Indicative of this is the fact that TiC and ZrC, per se, cannot be prepared by the method used to produce macro-crystalline TaC, but, when prepared in solid solution in TaC or CbC, they can be treated with acid, and dried with air, and preserve an exact monatomic ratio of carbon to metal.

Another reason for the great utility of the hard compositions of matter, including a comminuted macro-crystalline multi-carbide as an ingredient, is that such multi-carbides are harder than the simple carbides, following the generalization that all solid solutions are harder than their simple components. This effect is fundamental and is believed to be due to the straining of the atomic lattice, which is stressed internally by the substitution of atoms of different atomic radius in place of the Ta or Cb.

Furthermore, compositions made with macro-crystalline multi-carbides as ingredients generally have lower thermal conductivity, for the strained and harder lattices are poorer conductors. This is an advantage when the composition is used in certain kinds of drawing dies and tools, for, in these cases, a greater proportion of the heat, generated by mechanical work at the point of contact, is distributed to the piece on which the work is done. This may be a factor in the successful results obtained in cutting hardened high speed steel with the composition, hereinbefore mentioned, made with comminuted Ta (CbTi) C as an ingredient. In the cutting tests of this composition, it was observed that the chips of high speed steel came off at a yellow or white heat, at which temperature this steel is soft and workable, although it is still hard at a red heat, unlike steels which do not have this property of red-hardness. In this specimen of hard composition, the thermal conductivity was observed to be .036 calories per degree C., per second, per centimeter, while a similar composition made with TaC as the hard ingredient had a thermal conductivity of .06 calories, per degree C., per second, per centimeter.

Whenever I use the term "macro-crystalline" in the appended claims with reference to a carbide or multi-carbide, I mean a carbide or multi-carbide having particles which average greater than .01 millimeter in largest cross section dimension and produced by the reaction between a metal or metals and carbon in the presence of a menstruum other than the metal or metals.

I am aware that the products herein disclosed may be varied considerably, without departing from the spirit of my invention and, therefore, I claim my invention broadly as indicated by the appended claims.

What I claim is:

1. A new hard composition of matter consisting substantially of a matrix formed of an alloy of a metal of the group consisting of tungsten and molybdenum with a metal of the iron group, in which are embedded particles of a comminuted macro-crystalline multi-carbide having columbium carbide and titanium carbide in solid solution in tantalum carbide.

2. A new hard composition of matter consisting substantially of a matrix formed of an alloy of a metal of the group consisting of tungsten and molybdenum with a metal of the iron group, in which there are embedded particles of a comminuted macro-crystalline multi-carbide having tantalum carbide as its major constituent and, as a minor constituent, from 8 to 13 per cent columbium carbide, and from 8 to 12 per cent titanium carbide.

3. A new hard composition of matter consisting substantially of a matrix formed of from 18 to 25 per cent tungsten and from 5 to 8 per cent nickel, in which is embedded from 63 to 75 per cent of a comminuted macro-crystalline multi-carbide having, as a major constituent, tantalum carbide and, as a minor constituent, from 8 to 13 per cent columbium carbide and from 8 to 12 per cent titanium carbide.

4. A new hard composition of matter consisting substantially of a matrix formed of about 20 per cent tungsten and 7 per cent nickel, in which is embedded about 73 per cent of a comminuted macro-crystalline multi-carbide having, as a major constituent, tantalum carbide, and including about 13 per cent columbium carbide and 9 per cent titanium carbide.

5. A new hard composition of matter consisting substantially of a matrix formed of an alloy of a metal of the group consisting of tungsten and molybdenum with a metal of the iron group, in which are embedded particles of a comminuted macro-crystalline multi-carbide having, as a major constituent, tantalum carbide and, as a minor constituent carbides of a plurality of metals of the group consisting of columbium, titanium and zirconium.

6. The new hard composition of matter consisting substantially of a matrix formed of an alloy of a metal of the group including tungsten and molybdenum with a metal of the iron group, in which are embedded particles of a comminuted macro-crystalline multi-carbide containing columbium and zirconium in solid solution in tantalum carbide.

7. The new hard composition of matter consisting substantially of a matrix formed of an alloy of a metal of the group including tungsten and molybdenum with a metal of the iron group, in which there are embedded particles of a comminuted macro-crystalline multi-carbide having from 4 to 16 per cent of columbium carbide and from 2 to 8 per cent of zirconium carbide in solid solution in tantalum carbide.

8. The new hard composition of matter consisting substantially of from 7 to 12 per cent tungsten, from 12 to 15 per cent nickel, and from 68 to 78 per cent of a comminuted macro-crystalline multi-carbide having tantalum carbide as its major constituent and including from 2 to 8 per cent zirconium carbide and from 4 to 16 per cent columbium carbide.

9. The new hard composition of matter consisting substantially of about 10 per cent tungsten, about 13 per cent nickel, and about 76 per cent of a comminuted macro-crystalline multi-carbide having tantalum carbide as its major constituent and including about 15 per cent columbium carbide and about 4½ per cent zirconium carbide.

PHILIP M. McKENNA.